(12) United States Patent
Sakurai et al.

(10) Patent No.: US 11,791,694 B2
(45) Date of Patent: Oct. 17, 2023

(54) STATOR FOR AN ELECTRIC MOTOR AND COOLING THEREOF

(71) Applicants: Equipmake Ltd, Norfolk (GB); aim CO., LTD., Nagoya (JP)

(72) Inventors: Yoshitoshi Sakurai, Kanagawa (JP); Ian Foley, Norfolk (GB); Martin Ogilvie, Norfolk (GB); Rob Williamson, Norfolk (GB); Michio Kawamoto, Tokyo (JP)

(73) Assignees: Equipmake Ltd, Norfolk (GB); aim CO., Ltd., Nagoya (JP)

( * ) Notice: Subject to any disclaimer, the term of this patent is extended or adjusted under 35 U.S.C. 154(b) by 5 days.

(21) Appl. No.: 17/060,472

(22) Filed: Oct. 1, 2020

(65) Prior Publication Data

US 2021/0021176 A1 Jan. 21, 2021

Related U.S. Application Data

(63) Continuation of application No. 14/905,402, filed as application No. PCT/GB2014/052159 on Jul. 15, 2014, now abandoned.

(30) Foreign Application Priority Data

Jul. 16, 2013 (GB) ..................................... 1312678

(51) Int. Cl.
*H02K 5/20* (2006.01)
*H02K 9/197* (2006.01)
(Continued)

(52) U.S. Cl.
CPC ............ *H02K 9/197* (2013.01); *H02K 1/274* (2013.01); *H02K 1/32* (2013.01); *H02K 3/24* (2013.01);
(Continued)

(58) Field of Classification Search
CPC ............ H02K 9/197; H02K 9/04; H02K 9/09; H02K 1/274; H02K 1/32; H02K 1/2773;
(Continued)

(56) References Cited

U.S. PATENT DOCUMENTS 3,031,593 A * 4/1962 Cametti ................. H02K 5/128
310/214
3,742,595 A 7/1973 Lykes
(Continued)

FOREIGN PATENT DOCUMENTS

| CN | 201113681 Y | 9/2008 |
|---|---|---|
| CN | 102684337 A | 9/2012 |

(Continued)

OTHER PUBLICATIONS

Machine translation of JP-2010288373-A. (Year: 2010).*
(Continued)

*Primary Examiner* — Michael Andrews
(74) *Attorney, Agent, or Firm* — Wood Herron & Evans LLP

(57) ABSTRACT

A stator and a rotor suitable for use in an electric motor or generator. The stator comprises a plurality of stator cons and a support for holding the coils around a rotor of the motor. A cylindrical sleeve is mounted radially inwardly on the support to form a barrier in use between cooling fluid passing over the coils and a rotor located within the stator. The rotor comprises a hub, a plurality of rotor segments, and a plurality of permanent magnets. The segments are arranged around the hub in a ring, with the permanent magnets disposed between the segments. A radially outwardly facing exposed surface of each magnet is spaced radially inwardly from an outer cylindrical profile defined by the segments.

12 Claims, 14 Drawing Sheets

(51) Int. Cl.
*H02K 9/06* (2006.01)
*H02K 5/128* (2006.01)
*H02K 9/04* (2006.01)
*H02K 1/32* (2006.01)
*H02K 1/274* (2022.01)
*H02K 3/24* (2006.01)
*H02K 1/276* (2022.01)

(52) U.S. Cl.
CPC ............ *H02K 5/128* (2013.01); *H02K 5/203* (2021.01); *H02K 5/207* (2021.01); *H02K 9/04* (2013.01); *H02K 9/06* (2013.01); *H02K 1/2773* (2013.01)

(58) Field of Classification Search
CPC ............ H02K 3/24; H02K 5/128; H02K 5/20; H02K 5/203
USPC .............................................. 310/54, 58, 59
See application file for complete search history.

(56) References Cited

U.S. PATENT DOCUMENTS

| | | | |
|---|---|---|---|
| 4,200,818 A * | 4/1980 | Ruffing | H02K 3/493 |
| | | | 174/DIG. 19 |
| 4,498,024 A | 2/1985 | Moretti et al. | |
| 4,999,533 A * | 3/1991 | King | H02K 5/128 |
| | | | 310/90 |
| 5,039,897 A | 8/1991 | Iwamatsu et al. | |
| 5,347,188 A * | 9/1994 | Iseman | H02K 9/227 |
| | | | 310/68 D |
| 5,463,262 A | 10/1995 | Uchida | |
| 5,670,838 A | 9/1997 | Everton | |
| 5,786,650 A | 7/1998 | Uchida et al. | |
| 5,796,190 A | 8/1998 | Takeda et al. | |
| 5,952,755 A | 9/1999 | Lubas | |
| 6,335,582 B1 * | 1/2002 | Abukawa | H02K 5/1732 |
| | | | 310/216.074 |
| 6,762,520 B1 * | 7/2004 | Ehrhart | H02K 1/20 |
| | | | 310/86 |
| 8,446,121 B1 * | 5/2013 | Parsa | H02K 29/03 |
| | | | 310/156.01 |
| 2002/0047424 A1 | 4/2002 | Varenne | |
| 2002/0047476 A1 | 4/2002 | Okawa | |
| 2004/0004407 A1 | 1/2004 | Laurent et al. | |
| 2007/0241633 A1 * | 10/2007 | Kusase | H02K 19/22 |
| | | | 310/263 |
| 2008/0024018 A1 | 1/2008 | Rignault et al. | |
| 2008/0136271 A1 * | 6/2008 | Alfermann | H02K 1/20 |
| | | | 310/59 |
| 2010/0231066 A1 | 9/2010 | Korner | |
| 2010/0231067 A1 * | 9/2010 | Ruffing | H02K 1/32 |
| | | | 310/61 |
| 2012/0181880 A1 | 7/2012 | Zhao et al. | |
| 2012/0326548 A1 | 12/2012 | Nonaka | |
| 2013/0049493 A1 | 2/2013 | Zhao et al. | |
| 2013/0229082 A1 | 9/2013 | Zhang et al. | |
| 2014/0191609 A1 | 7/2014 | Woo et al. | |
| 2014/0265683 A1 * | 9/2014 | Hossain | H02K 15/14 |
| | | | 310/89 |

FOREIGN PATENT DOCUMENTS

| | | |
|---|---|---|
| CN | 202524184 U | 11/2012 |
| CN | 202918133 U | 5/2013 |
| DE | 202005021025 U1 | 12/2006 |
| EP | 0449538 A1 | 10/1991 |
| EP | 0822641 A2 | 2/1998 |
| EP | 0866540 A2 | 9/1998 |
| EP | 1333561 A2 | 8/2003 |
| EP | 2523314 A2 | 11/2012 |
| EP | 2544335 A2 | 1/2013 |
| GB | 196970 A | 6/1958 |
| GB | 883827 A | 12/1961 |
| GB | 965801 A | 8/1964 |
| GB | 1246353 A | 9/1971 |
| GB | 1294561 A | 11/1972 |
| GB | 2159340 A | 11/1985 |
| GB | 2269707 A | 2/1994 |
| GB | 2396971 A | 7/2004 |
| JP | S63100947 U | 6/1988 |
| JP | H102193546 A | 7/1990 |
| JP | 2003052155 A | 2/2003 |
| JP | 2003158842 A | 5/2003 |
| JP | 2010288373 A | 12/2010 |
| JP | 2010288373 A * | 12/2010 |
| WO | 9200627 A1 | 1/1992 |
| WO | 0048290 A1 | 8/2000 |
| WO | 2012085281 A2 | 6/2012 |

OTHER PUBLICATIONS

Espacenet, English Machine Translation of Abstract for JPH02193546A, published on Jul. 31, 1990, retrieved from http://worldwide.espacenet.com on Jan. 6, 2016 (2 pages).
Espacenet, English Machine Translation of Abstract for JP2003052155A, published on Feb. 21, 2003, retrieved from http://worldwide.espacenet.com on Jan. 6, 2016 (2 pages).
Espacenet, English Machine Translation of Abstract for DE202005021025U1, published on Dec. 28, 2006, retrieved from http://worldwide.espacenet.com on Jan. 6, 2016 (1 page).
Espacenet, English Machine Translation of Abstract for CN201113681Y, published on Sep. 10, 2008, retrieved from http://worldwide.espacenet.com on Jan. 6, 2016 (1 page).
Espacenet, English Machine Translation of Abstract for JP2010288373A, published on Dec. 24, 2010, retrieved from http://worldwide.espacenet.com on Jan. 6, 2016 (2 pages).
Espacenet, English Machine Translation of Abstract for CN202918133U, published on May 1, 2013, retrieved from http://worldwide.espacenet.com on Jan. 6, 2016 (1 page).
European Patent Office, International Search Report and Written Opinion of the International Searching Authority, International Application No. PCT/GB2014/052159, dated Aug. 17, 2015 (16 pages).
United Kingdom Intellectual Property Office, Patents Act 1977: Search Report under Section 17, Application No. GB1312678.4, dated Jan. 7, 2014 (2 pages).
United Kingdom Intellectual Property Office, Patents Act 1977 Further Search Report under Section 17, Application No. GB1312678.4, dated Jun. 19, 2014 (2 pages).
Espacenet, English Machine Translation of Abstract of CN102684337A, published on Sep. 19, 2012, retrieved from http://worldwide.espacenet.com on Jan. 7, 2016 (2 pages).
European Patent Office, International Search Report and Written Opinion of the International Searching Authority, International Application No. PCT/GB2014/052160, dated Sep. 3, 2015 (13 pages).
Espacenet, English Machine Translation of Abstract of CN202524184U, published on Nov. 7, 2012, retrieved from http://worldwide.espacenet.com on Feb. 5, 2016 (2 pages).
United Kingdom Intellectual Property Office, Patents Act 1977: Search Report under Section 17, Application No. GB1312677.6, dated Dec. 23, 2013 (2 pages).
Espacenet, EPO and Google, English Machine Translation of JP2010288373A, published on Dec. 24, 2010, retrieved from http://worldwide.espacenet.com and http://translationportal.epo.org on Feb. 12, 2018 (9 pages).

* cited by examiner

STATOR FOR AN ELECTRIC MOTOR AND COOLING THEREOF

CROSS-REFERENCE TO RELATED APPLICATIONS

The present application is a continuation of co-pending U.S. patent application Ser. No. 14/905,402, filed Jan. 15, 2016, which is a submission under 35 U.S.C. § 371 of International Application No. PCT/GB2014/052159, filed Jul. 15, 2014, which claims priority to Great Britain Application No. 1312678.4, filed Jul. 16, 2013, the disclosures of which are hereby expressly incorporated by reference herein in their entireties.

FIELD OF THE INVENTION

The present invention relates to a stator and a rotor suitable for use in an electric motor or generator. More particularly, it concerns the cooling of these components.

BACKGROUND OF THE INVENTION

Rotors for use in motors such as brushless DC motors include permanent magnets held within the rotor. Torque is applied by a rotating magnetic field. This is created by applying current, usually in three separate phases, to stationary coils mounted in an outer stator. This type of motor is becoming increasingly popular due to advances in the control and power electronics required to electrically commutate the current supply to the stator. Such machines are often called motors but may equally be used as motors, generators or motor/generators.

Heat is generated by many mechanisms in motors, primarily by resistive losses in the coils and by inductive losses (due to fluctuating magnetic fields causing electrical eddy currents) in the metal used to provide a high-permeability path for the magnetic and electromagnetic fields. The power rating and efficiency of motors such as DC brushless motors is largely limited by cooling considerations and the ability of the coils to carry current without overheating and melting.

In some existing liquid-cooled motor configurations, heat passes from the stator coils to a surrounding metal casing or jacket which is in turn in contact with a cooling fluid.

SUMMARY OF THE INVENTION

The present invention provides a stator for an electric motor, the stator comprising:
a plurality of stator coils;
a support for holding the coils around a rotor of the motor; and
a cylindrical sleeve mounted radially inwardly of the support to form a barrier in use between cooling fluid passing over the coils and a rotor located within the stator.

Such a configuration enables different fluids to be used for cooling the stator and the rotor, respectively. Preferably, a liquid is used to cool the stator. Air may be used, for example, to cool the rotor. With the cooling fluid able to pass directly over the stator coils, instead of having another component such as a stator support or casing between the coils and the fluid, it is possible to take heat away from the coils at a significantly higher rate. The ability to remove heat from the coils more effectively allows higher current densities to be used, resulting in a smaller motor for a given output.

In preferred embodiments, the sleeve is an interference fit into position during assembly of the stator. More particularly, it may be an interference fit with radially inwardly facing surfaces of the support.

The support may comprise the core of the stator.

The support may define a plurality of inwardly facing channels, along which windings of the coils extend, with the sleeve closing the inwardly facing open sides of the channels. Cooling fluid may then be fed along the channels, over the coil windings, during operation of the motor.

Two sleeve end supports may be provided in engagement with respective ends of the sleeve to provide additional support for the sleeve. The sleeve is preferably formed of a fibre-reinforced material, such as a carbon fibre or Kevlar reinforced material. Fibres in adjacent concentric layers of the sleeve may be wound in opposing spirals.

The present invention also provides a stator for an electric motor, the stator comprising:
a plurality of stator coils;
a support for holding the coils around a rotor of the motor rotatable about an axis of the motor; and
a housing which extends around the stator, wherein a fluid path is defined between the support and the housing for receiving cooling fluid, the fluid path including a plurality of sections which extend in an axial direction over the length of the support.

This enables a motor including the stator to be made more compact. With the fluid paths passing over the support substantially parallel to the axial direction, axially extending rods or bolts used to hold the motor together can be located circumferentially between adjacent sections of the fluid path at a similar distance from the motor axis. This is in contrast to known motor configurations in which the fluid paths extend over the support in a helical configuration, requiring supporting bolts to be provided radially outwardly from the cooling paths, thereby increasing the overall diameter of the motor.

The support may define holes for receiving axially extending rods or bolts that couple the support to a housing of a motor containing the stator, with the holes locating the rods in the assembled motor between adjacent axially extending sections of the fluid path.

The coils may include a thermally conductive covering material, either over each strand individually, or covering the wound coils. This covering serves to protect the coils and assist the extraction of heat from the coils.

The coils may be profiled to assist the flow of liquid around and between adjacent windings in the coils. For example, inner windings of the coils may be less densely packed together than outer windings of the coils so that they are exposed to the cooling liquid to a greater extent. The inner windings are likely to become hotter than the outer windings (as they are closer to the magnets of the rotor) and so this arrangement seeks to compensate for this.

The present invention further provides a rotor for an electric motor, the rotor comprising:
a hub;
a plurality of rotor segments; and
a plurality of permanent magnets,
wherein the segments are arranged around the hub in a ring, with the permanent magnets disposed between the segments, and a radially outwardly facing exposed surface of each magnet is spaced radially inwardly from an outer cylindrical profile defined by the segments.

In some known rotor configurations, the rotor segments and permanent magnets are retained on a hub by a sleeve.

However, this impedes the conduction of heat away from the rotor. In the claimed arrangement, the rotor is constructed such that a radially outwardly facing surface of each magnet is exposed so that it can be in direct contact with a surrounding cooling fluid such as air. Furthermore, this exposed surface of each magnet is spaced radially inwardly from the outer circumference defined by the segments. This assists the circulation of the cooling fluid adjacent to the exposed surfaces, enhancing the extraction of heat from the magnets.

In preferred embodiments, the hub of the rotor includes a radially extending flange having a contoured surface facing the rotor segments. The surface is contoured so as to draw cooling fluid adjacent to the flange radially outwards as the flange rotates with the rotor. In this way, cooling fluid may be drawn through the centre of the rotor and urged radially outwardly by the contoured flange. The fluid may then pass along the length of the rotor and over the set back surfaces of the magnets.

A plurality of radially extending grooves may be defined by the contoured surface. The grooves may be linear or curved in the radial direction. They may be curved in the plane of the flange and/or in a plane perpendicular to the flange.

An axially extending groove may be defined in the outwardly facing surfaces of the rotor segments. This assists the extraction of heat from the rotor segments by the cooling fluid. Each groove may be located substantially centrally (in the circumferential direction) in the outwardly facing surface of each rotor segment.

BRIEF DESCRIPTION OF THE DRAWINGS

Embodiments of the present invention will now be described by way of example and with reference to the accompanying schematic drawings, wherein.

DETAILED DESCRIPTION OF THE INVENTION

In the following discussion, some dimensions are given. It will be appreciated that these dimensions are merely given to provide examples of relative sizes and proportions of the features concerned, and may be varied and/or scaled to suit different requirements.

Figure 1:
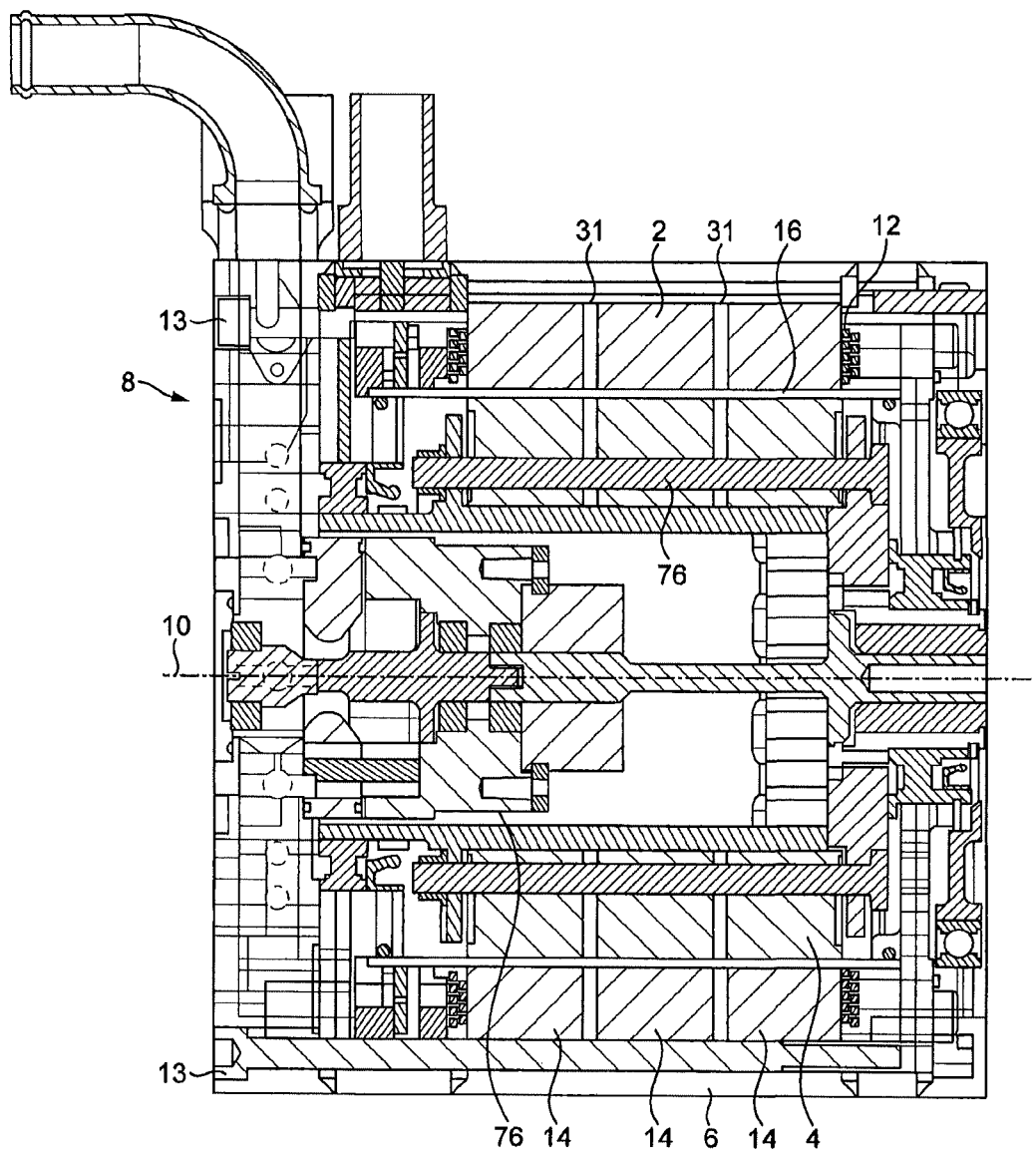
FIG. 1 is a cross-sectional side view of a motor embodying the present invention.

A longitudinal cross-sectional view of a motor including a stator configuration according to an embodiment of the present invention is shown in FIG. 1. A stator 2 and rotor 4 are located within the motor casing 6 of the motor 8. The rotor rotates about a central axis 10.

Stator coils 12 are elongated in the axial direction and extend around respective, circumferentially spaced segments 14 of a laminated stator core. The segments may be formed of silicon or cobalt steel or another material suitable for motor laminations.

A plurality of axially extending bolts 13 clamp the motor assembly together between end plates. They also transmit the reaction torque from the stator segments 14 to the motor casing 6 and keep all of the stator segments aligned rotationally.

A sleeve 16 is an interference fit with the inner circumferential surface of the stator and will be discussed in further detail below.

Figure 2:
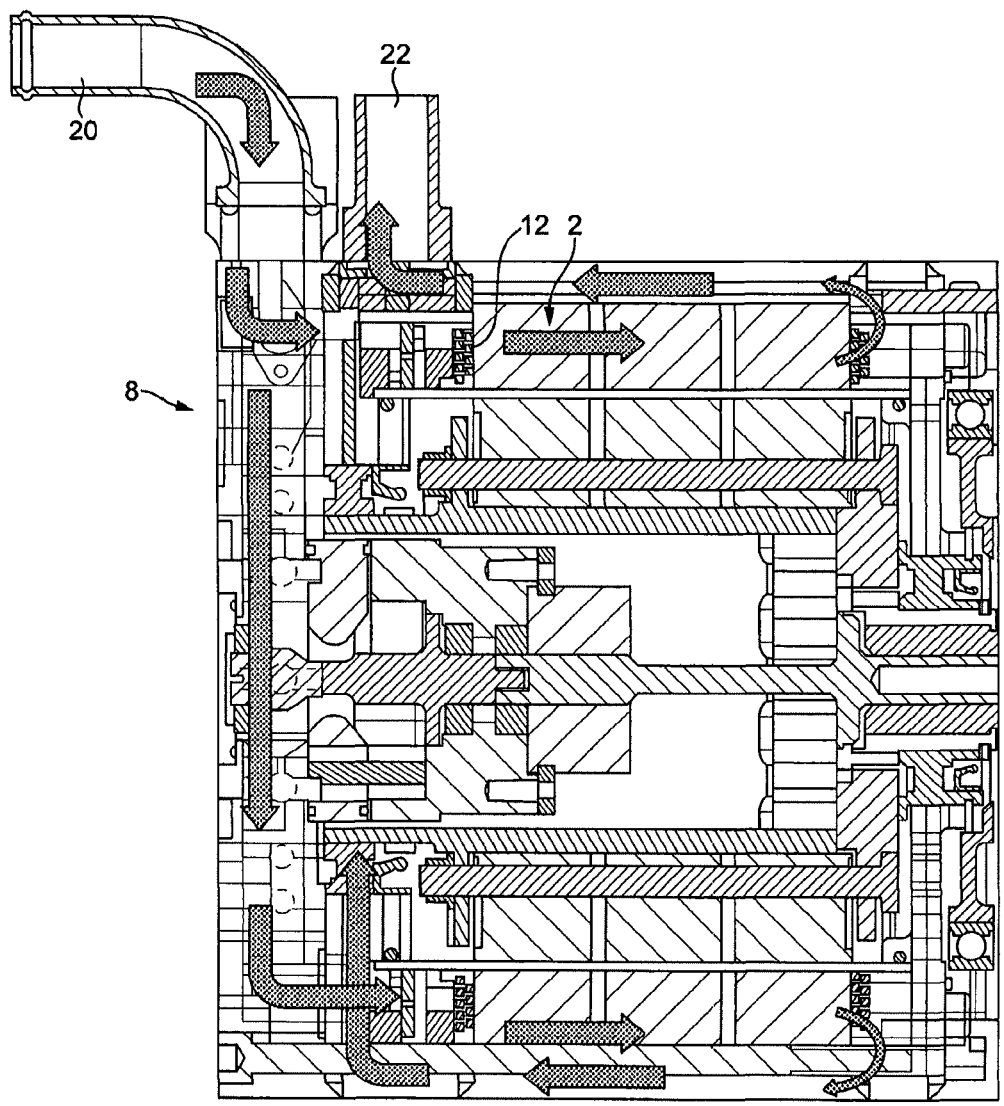
FIG. 2 is a cross-sectional side view of a motor embodying the present invention to illustrate the flow of cooling fluid over the stator.

FIG. 2 illustrates schematically how cooling liquid is fed into the motor 8 via an inlet 20. The liquid flows through an inner portion of the stator 2 in direct contact with the coils 12, in an axial direction from one end of the motor towards the other (in a single pass or multiple passes). The liquid flow then returns, flowing over the outer surface of the stator, and exiting the motor via an outlet 22. The liquid may flow over the outer surface in a single pass, or in multiple passes from one end to the other.

Figure 3:
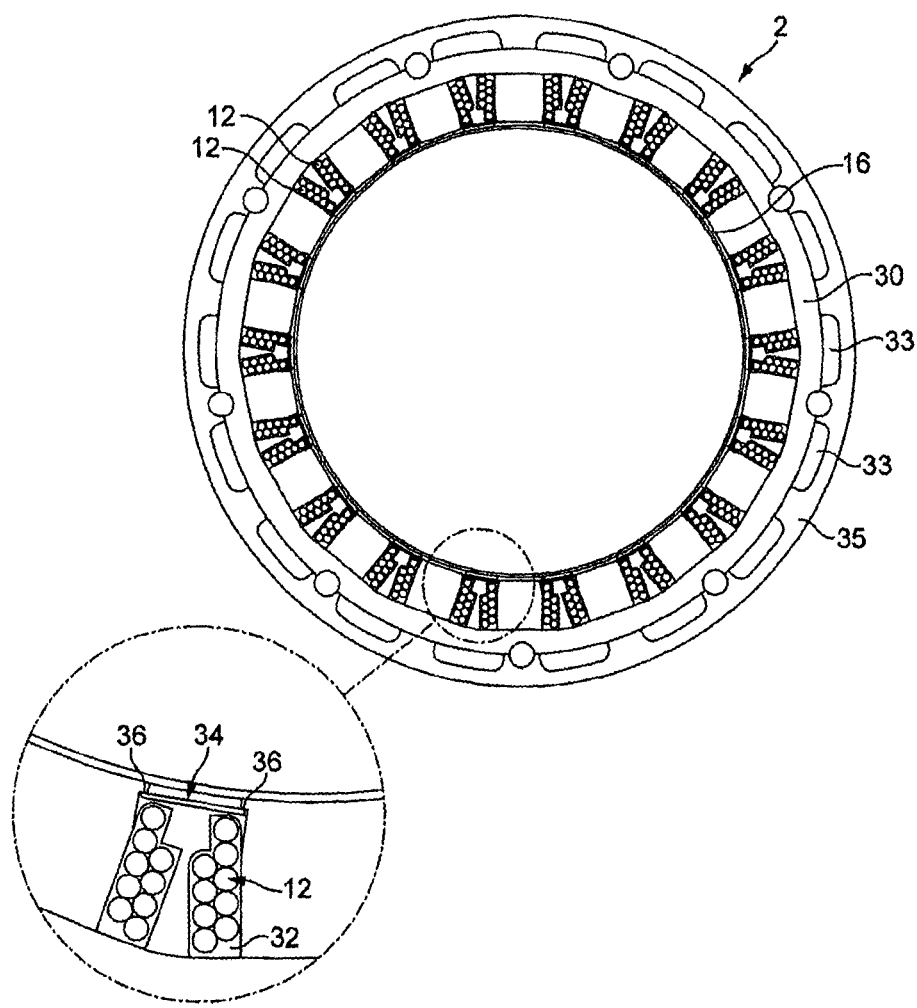
FIG. 3 is a transverse cross-sectional view of a stator embodying the present invention, together with an enlarged view of one portion thereof.

FIG. 3 shows a transverse cross-sectional view of a stator according to an embodiment of the present invention, together with an enlarged view of one portion of a stator. The stator includes a support 30 onto which the close-fitting coils 12 are mounted. The support may include a number of planar stator rings (31, see FIG. 1) with rings of stator segments 14 located between them in the axial direction. The sleeve 16 is an interference or friction fit within the support, engaging with the stator segments or both the segments and the stator rings.

Figure 4:
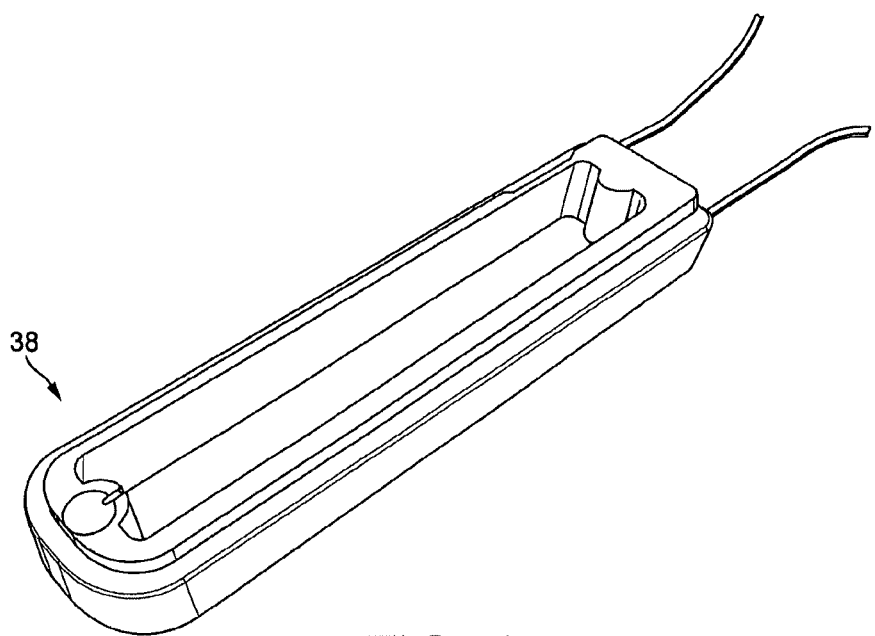
FIG. 4 is a perspective view of an encased stator coil for use in a stator embodying the present invention.

As can be seen in the enlarged portion of FIG. 3, the coils are encased in thermally conductive mouldable material. The covering penetrates into the coil forming a "potted coil" 38 having a configuration shown in FIG. 4. The coils are retained in position by thin axially extending retainers 34. The inwardly facing surface of each retainer engages with ledges 36 defined by the adjacent stator core laminations. The retainers serve to prevent the coils from exerting any significant load on the sleeve 16.

The retainers may be formed of any non-conductive, non-magnetic material, such as a glass-fibre based composite material.

Axially extending channels 33 for receiving cooling fluid are defined between the support 30 and the motor housing 35.

Figure 5:
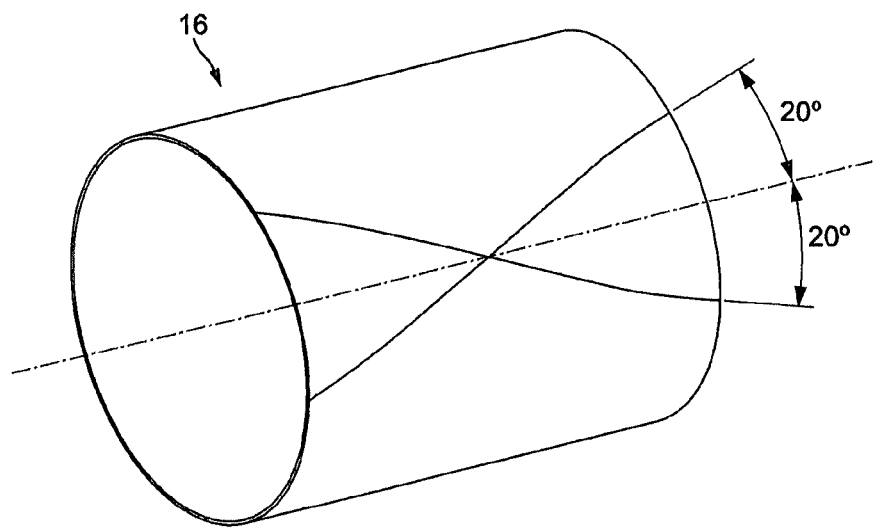
FIG. 5 is a perspective view of a sleeve of a stator embodying the present invention.

A perspective view of the sleeve 16 is shown in FIG. 5. The sleeve has a cylindrical configuration and is preferably as thin as practicable in the radial direction to minimise so-called air-gap loss of magnetic flux and thus reduction in the coupling of torque between the rotor and the stator. In the embodiment illustrated, the sleeve thickness is minimised by using an advanced composite material. Preferably, a high modulus of stiffness fibre reinforced epoxy plastic may be used. The sleeve may include fibres of glass, Kevlar or carbon, or combinations of fibres of different materials. Carbon may be preferred due to its high elastic modulus.

The sleeve comprises a number of concentric layers of fibres, with the fibres preferably helically wound in opposite directions in adjacent layers. For example, as shown in FIG. 5, the fibres may be wound at an angle of around 20 degrees to the axial direction in one layer and then 20 degrees to the axis in the opposite direction in the next layer.

Figure 6:
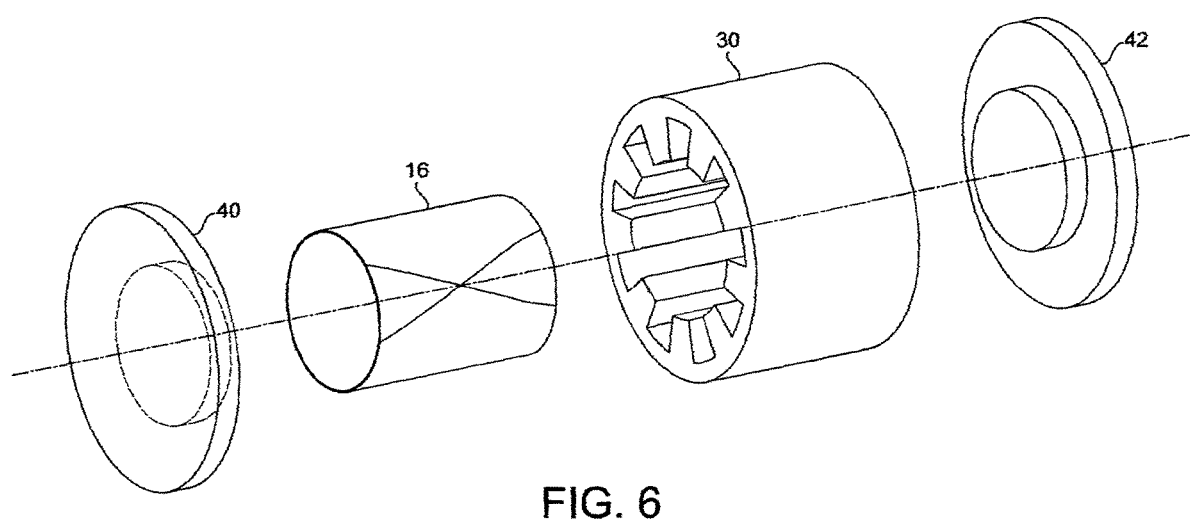
FIG. 6 is an exploded perspective view of a stator embodying the present invention.

In the exploded view of FIG. 6, it can be seen how the sleeve 16 is received by a stator support or core 30. In addition, end supports 40 and 42 are engaged within respective ends of the sleeve. By ensuring that the sleeve 16 is a tight fit within the stator support 30, this further increases its strength by restricting transition into an inward buckling mode. Alternatively, or in addition, the sleeve may be bonded to the stator support.

The sleeve is preferably formed of a filament wound composite. For example, the sleeve may have a thickness of around 0.2 to 0.4 mm, with fibres wound in opposed spirals set at plus and minus around 20 to 45 degrees to the axial direction. A helical configuration with a relatively small angle of winding is preferable as, although the primary loads expected in use would be better carried by a radial layup, the helical configuration gives a more robust structure able to cope with loads imparted during installation, loads due to manufacturing imperfections, and the like.

The sleeve enables liquid cooling to be used for the stator, in combination with air cooling for the rotor. The use of a liquid rather than a gas to cool the stator increases the rate at which heat can be extracted from the stator, whilst air cooling for the rotor, rather than liquid cooling, reduces the amount of drag on the rotor by the cooling fluid.

In preferred configurations, a fluid path is defined between the stator support and the motor housing for the cooling fluid, which path includes a plurality of sections or channels 33 (see FIG. 3) which extend in an axial direction over the length of the support.

Figure 7:
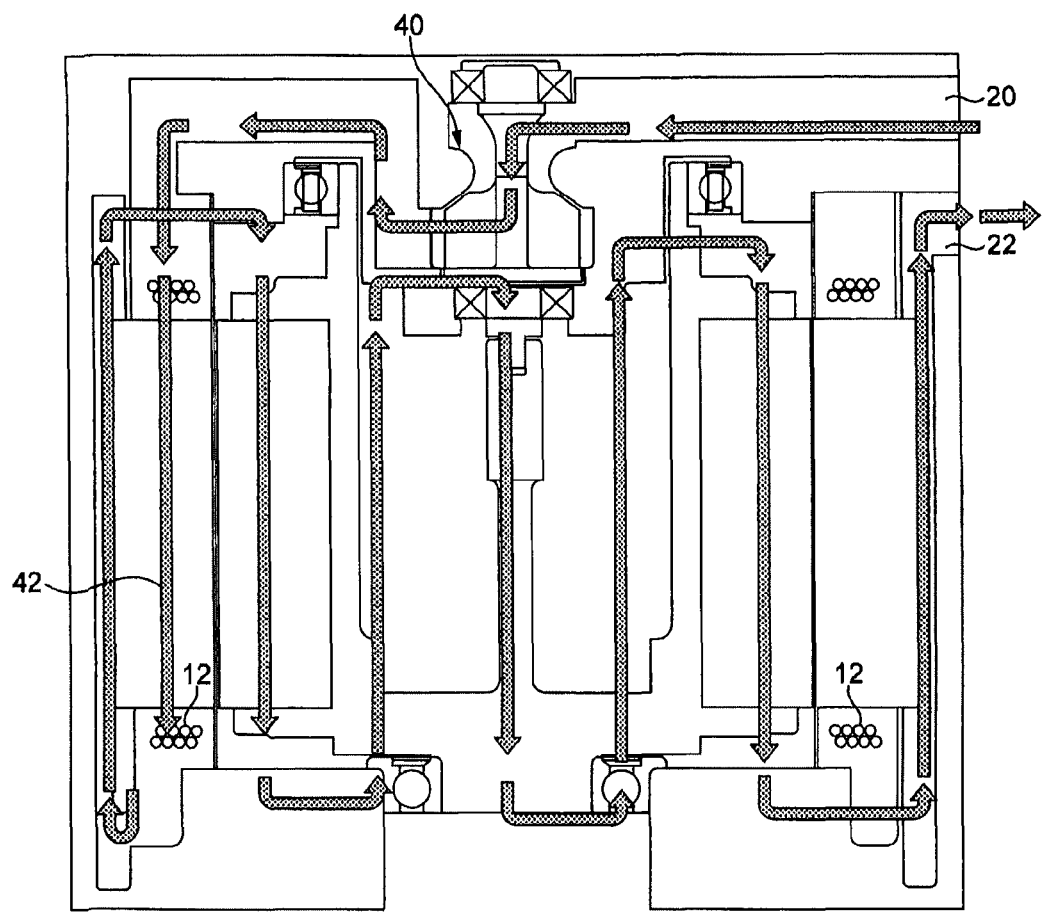
FIGS. 7 to 9 illustrate a scheme for circulating cooling fluid over a stator according to an embodiment of the present invention.
Figure 8:
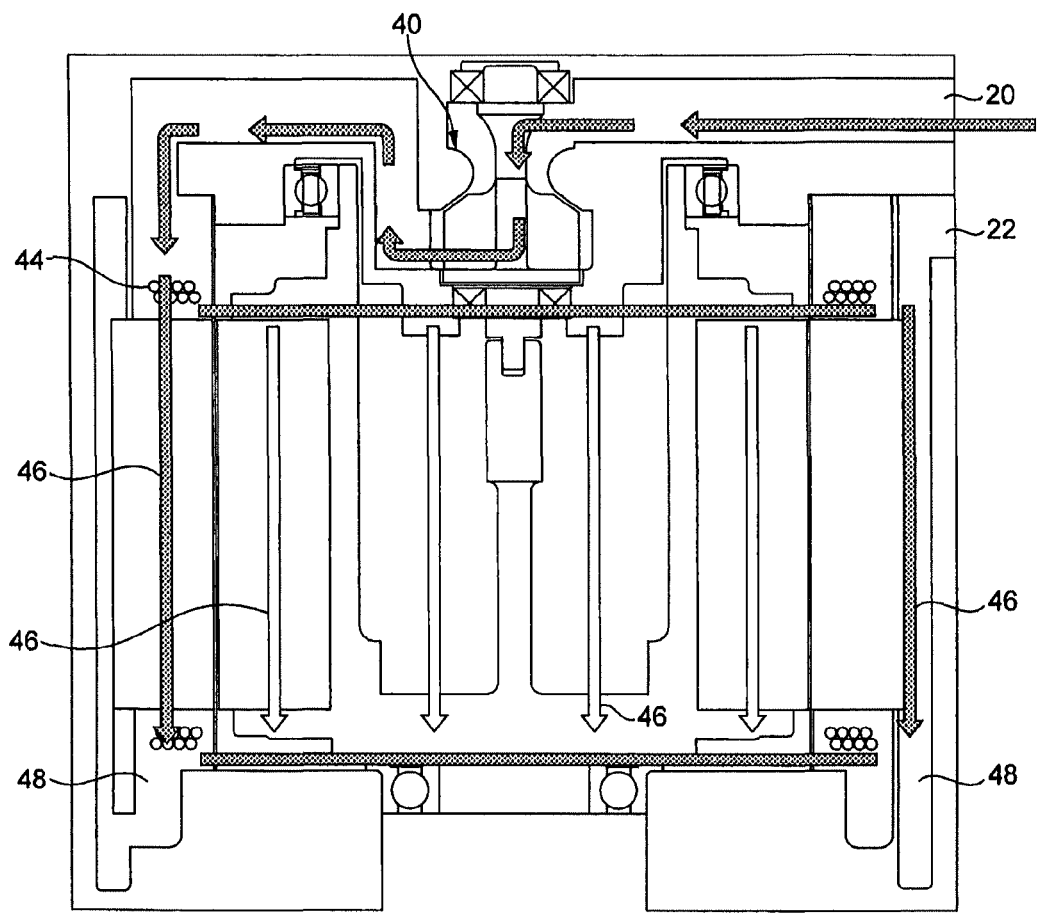
Figure 9:
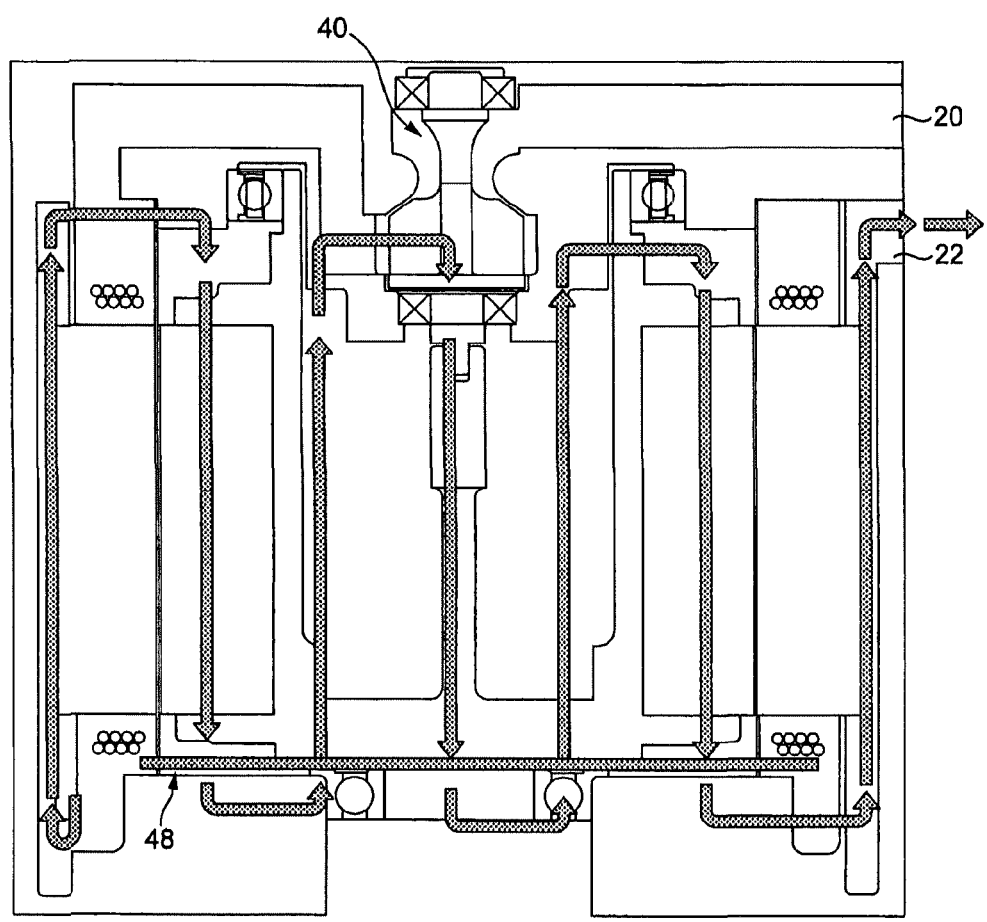

A scheme for directing the cooling liquid over the inner and outer surfaces of the stator whilst including these axial sections is shown in FIGS. 7 to 9 by way of example. In this example, a pump 40 for the cooling fluid is integrated into the motor so that it is directly driven with the rotor. Alternatively, an external pump may be employed to move the cooling fluid.

The overall flow scheme is shown in FIG. 7. The coolant flow enters via inlet 20, passes through the pump 40 and then flows (42) along the inner surface of the stator support, alongside the coil windings. The cooling fluid then flows across the length of the stator support multiple times before exiting the motor via outlet 22. The flow over the inner surface of the stator is shown in more detail in FIG. 8. The coolant fluid flow splits (44) at one end of the stator to flow (46) past each of the coils and then recombines (48) at the other end of the stator. As illustrated in FIG. 9, the recombined flow (48) is then circulated in one or more passes between the outside of the stator and the motor casing surrounding the stator.

The coolant pump 40 may be direct driven or electrically powered. It may be located inside the rotor hub. It may be a centrifugal pump, for example.

Figure 10:
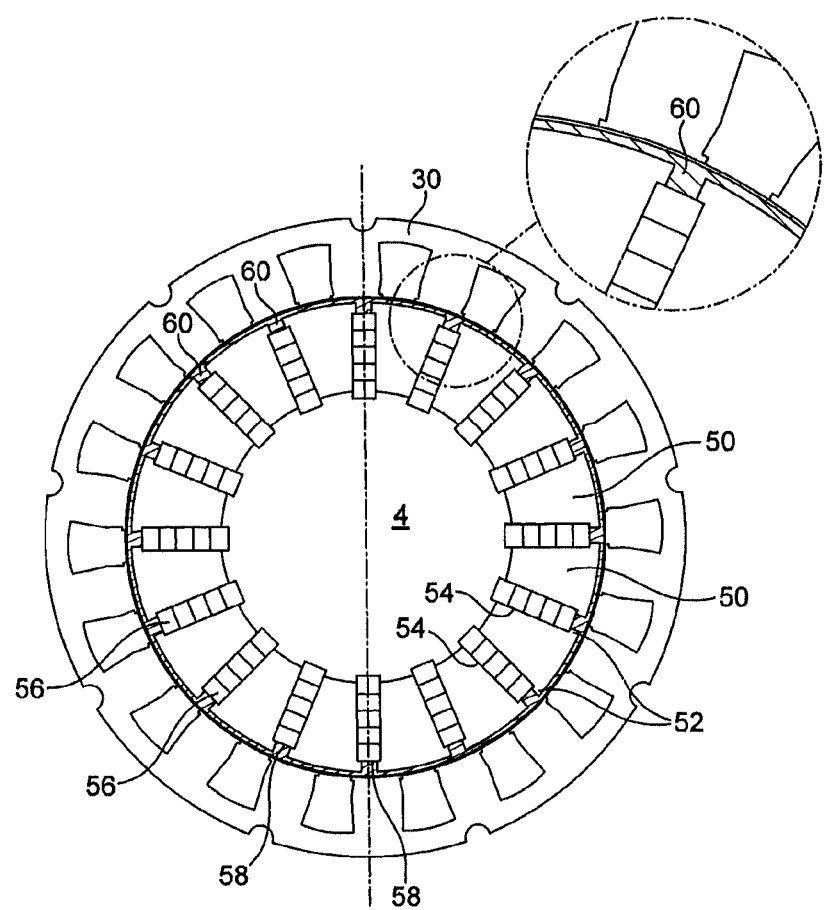
FIG. 10 is a transverse cross-sectional view of a stator and rotor of a motor according to an embodiment of the present invention, including an enlarged view of one part of the drawing.

FIG. 10 shows a transverse, schematic cross-section through the stator support 30 and rotor 4 of the motor.

A plurality of separate laminated rotor segments 50 formed of material having a high magnetic permeability (such as silicon or cobalt steel) are arranged in a ring-shaped distribution around the hub of the rotor. The radially outermost portion of each segment defines a projection or lip 52 which extends in a circumferential direction (by about 1 mm) beyond the respective side face 54 of the segment. A permanent magnet 56 is disposed between each pair of adjacent segments. The magnets are typically of "rare earth" type. Their dimensions may be 5 mm wide by 20 mm in the axial direction by 25 mm, for example. The outwardly facing, exposed side 58 of each magnet is in engagement with an inwardly facing surface of the lips 52 of the adjacent segments. The lips extend circumferentially partway across the sides 58 of each of the magnets. Thus, the magnets are retained at a location spaced from the rotor's outside diameter.

Retention of the magnets by the lips formed on the rotor segments avoids encasing the rotor with a sleeve. This enables the width of the air-gap between the rotor and the surrounding stator to be reduced. Also, a sleeve tends to inhibit heat loss from the rotor. As the lips 52 only extend partway across the magnets, this facilitates direct contact between cooling air and the surface of the magnets. As the magnets are set back from the outer cylindrical profile of the rotor segments 50, a groove 60 is defined adjacent to the exposed sides 58 of each magnet, encouraging air flow and turbulence adjacent to the magnets and thereby assisting the cooling of the magnets.

Figure 11:
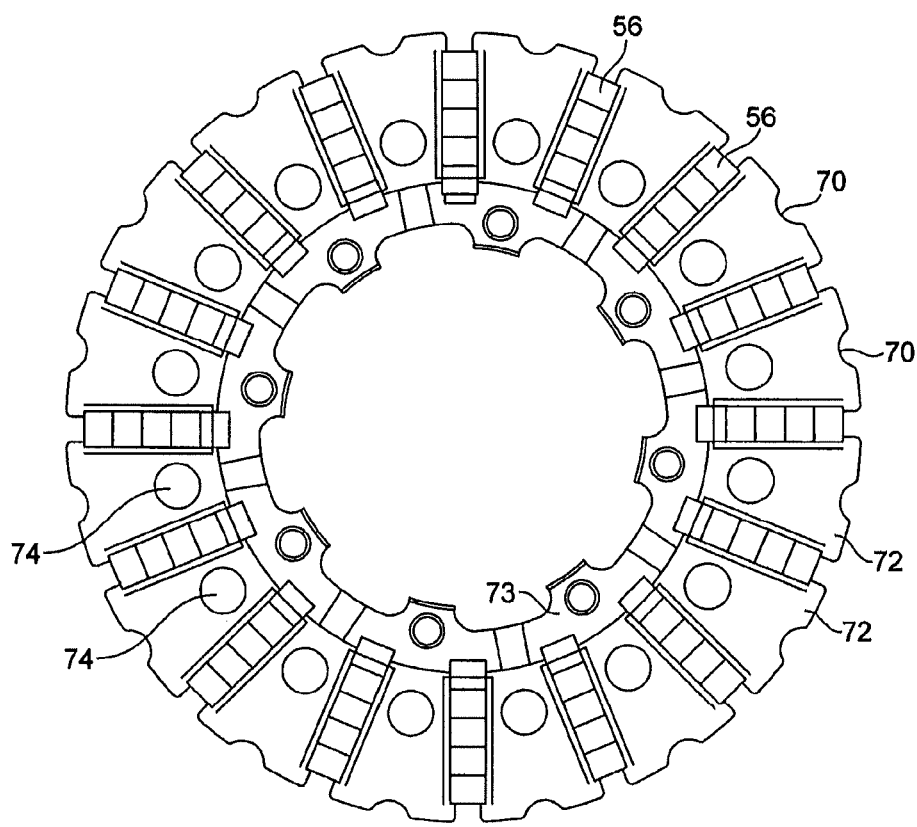
FIG. 11 is a transverse cross-sectional view of another rotor configuration embodying the present invention.

A similar rotor embodiment is shown in FIG. 11. In this embodiment, further grooves 70 are defined in the outwardly facing surfaces of the rotor segments 72 arranged around a rotor hub 73. These grooves have a shallow, U-shaped cross-sectional profile. They extend axially along the outer surface of each rotor segment. The grooves are preferably located centrally on this outer surface in the circumferential direction as the amount of magnetic flux in this region is relatively low, thereby minimising the extent to which the formation of the grooves compromises the coupling of magnetic flux between the rotor and the stator. The grooves may, for example, be around 2-5 mm wide and 2-5 mm deep. It can be seen that they increase the surface area available for the transfer of heat away from the rotor segments.

A hole 74 is defined through each rotor segment for receiving a respective retaining bolt 76 (of high tensile steel, for example, around 6 mm in diameter and around 70 mm long), which is visible in FIG. 1.

Figure 12:
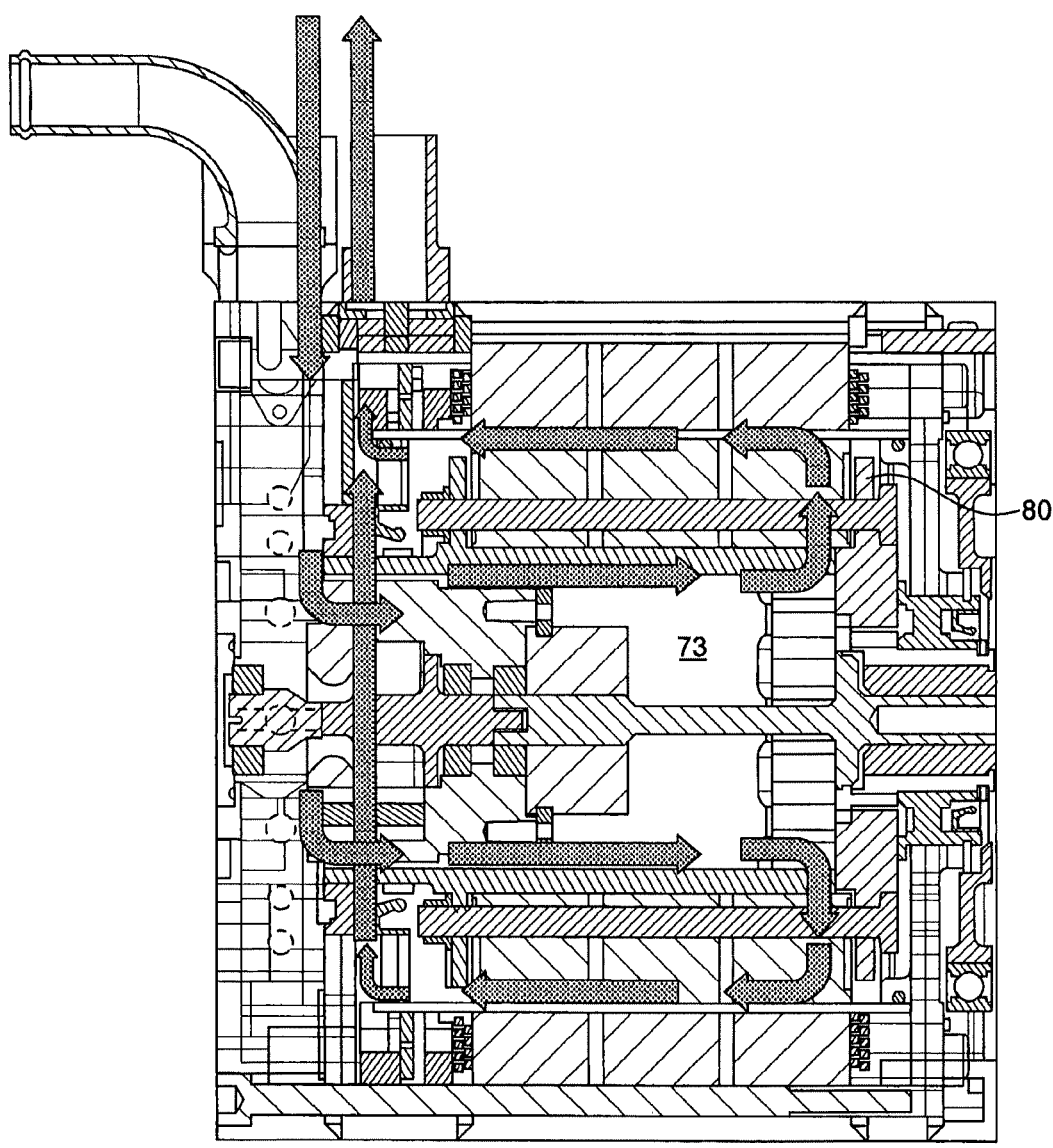
FIG. 12 is a cross-sectional side view of a motor embodying the present invention to illustrate the flow of cooling air around the rotor.
Figure 13:
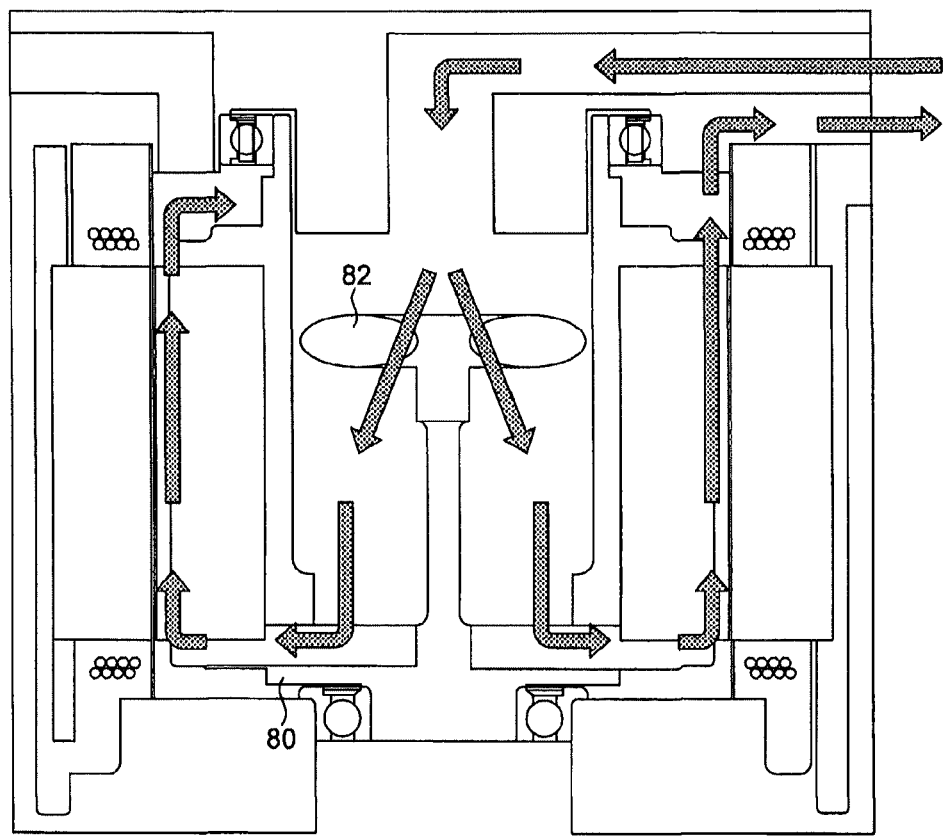
FIG. 13 is a cross-sectional side view of another motor configuration illustrating the flow of air around the rotor.

The flow of cooling air around the rotor is illustrated schematically in FIG. 12. The incoming air is directed over the inner surface of the rotor hub 73. At the other end of the rotor, it flows over an end flange 80 which rotates with the rotor hub. The air then flows back across the rotor over its outer circumferential surface before being directed out of the motor. As the air flows over the outer surface of the rotor, some passes through the grooves 60 defined in the outer surface of the rotor. As indicated in FIG. 13, a fan 82 to assist circulation of the air may be located within the rotor hub and directly driven by the rotor. Alternatively, or in addition, an external fan may be coupled to the motor and used to circulate cooling air over the rotor. The external fan may be electrically driven, for example.

Figure 15:
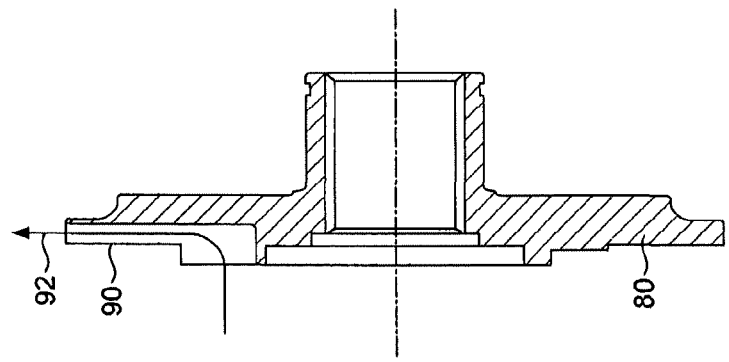
FIGS. 14 to 16 illustrate embodiments of a rotor end flange.
Figure 14:
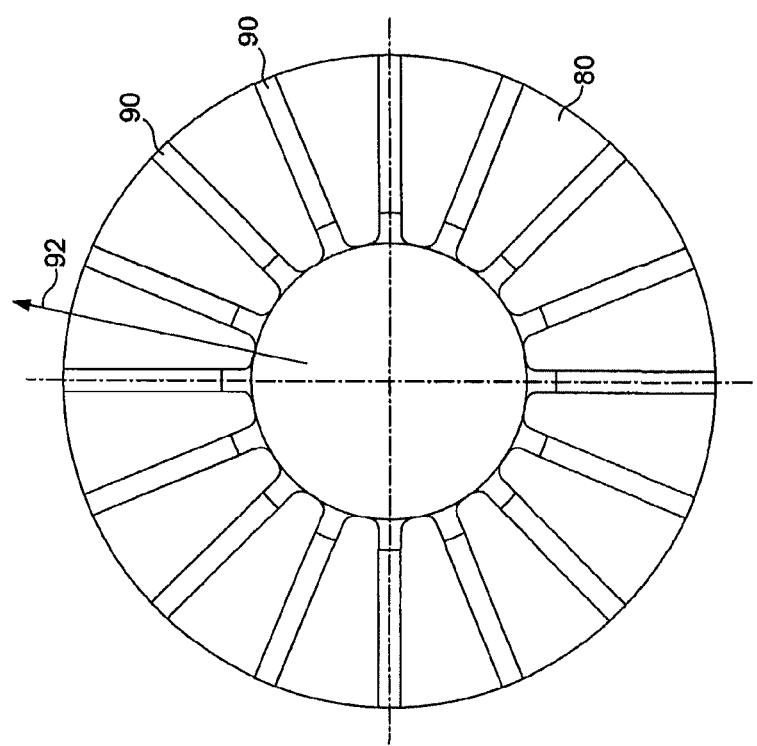
Figure 16:
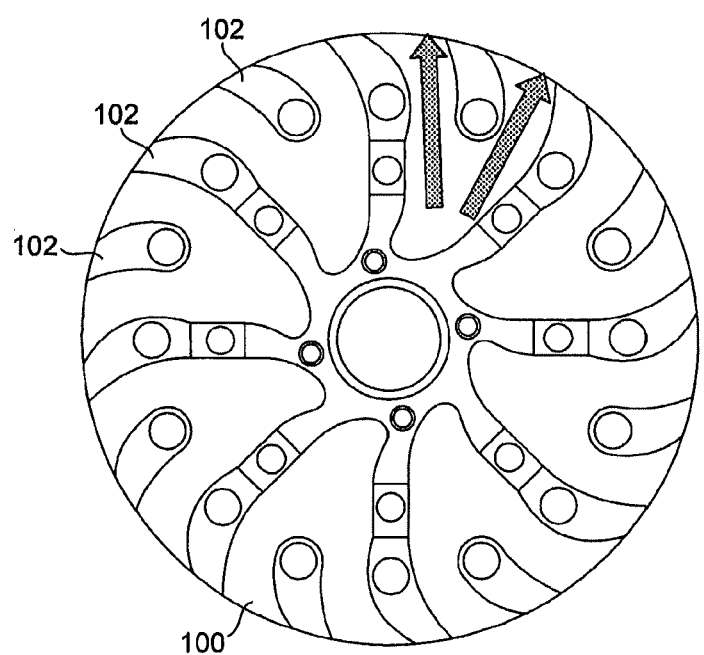

The configuration of the end flange is shown in two embodiments in FIGS. 14 to 16. In the embodiment of FIGS. 14 and 15, the end flange 80 has a plurality of radially extending grooves 90 defined on its surface facing the rotor segments. The grooves encourage radially outward flow (92) of the air, drawing it out from the centre of the rotor and towards its outer surface.

In the end flange embodiment illustrated in FIG. 16, the flange 100 has radially extending grooves 102 defined in its surface which are all curved in the plane of the flange in one circumferential direction as they approach the outer periphery of the flange. This further enhances the flow of air over the rotor, giving a more gradual change of direction of the air at the outer edge of the flange when the flange is rotating.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A stator for an electric motor, the stator comprising:
   a plurality of stator coils;
   a support for holding the coils around a rotor rotatable about a central axis of the motor;
   a cylindrical sleeve mounted radially inwardly of the support to form a barrier in use between cooling fluid passing over the coils and the rotor located within the stator; and
   a housing which extends around the support and has an outer cylindrical surface, wherein a fluid path is defined between the support and the housing for receiving cooling fluid, the fluid path including a plurality of channel sections which extend in a substantially axial direction between an outer cylindrical surface of the support and the housing over the length of the support,
   wherein both the support and the housing define each of a set of holes located at an interface between the support and the housing for receiving axially extending rods that couple the support to the housing, wherein the set of holes locates the rods in the assembled motor between adjacent axially extending channel sections of the fluid path such that the set of holes and the axially extending channel sections overlap each other in the circumferential direction, and wherein the set of holes is located radially inwardly of the outer cylindrical surface of the housing.

2. The stator of claim 1, wherein the sleeve is formed of a fibre-reinforced material.

3. The stator of claim 2, wherein the sleeve is formed of a carbon fibre-reinforced material.

4. The stator of claim 2, wherein the material includes fibres wound in opposed spirals in at least two adjacent layers.

5. The stator of claim 1, including two sleeve end supports which are received inside respective ends of the sleeve.

6. The stator of claim 1, wherein the sleeve is an interference fit within the stator.

7. The stator of claim 6, wherein the sleeve is an interference fit with radially inwardly facing surfaces of the support.

8. The stator of claim 1, wherein the support defines a plurality of inwardly facing channels along which windings of the coils extend, and the sleeve closes the inwardly facing open sides of the channels.

9. The stator of claim 1, wherein the coils include a thermally conductive covering material.

10. The stator of claim 1, wherein the cooling fluid is a liquid.

11. The stator of claim 1, wherein radially inner windings of the coils are less densely packed than radially outer windings of the coils to assist circulation of the fluid over the coils; and
    a plurality of axially extending retainers are provided for retaining the coils in position, each retainer having a lamina shape lying in an axially extending plane, being located radially inwardly of the adjacent coils, having a radially inwardly facing planar surface which engages with ledges defined by the support, and being formed of a non-conductive, non-magnetic glass-fibre based composite material.

12. An electric motor in combination with a stator, the stator comprising:
    a plurality of stator coils;
    a support for holding the coils around a rotor rotatable about a central axis of the motor;
    a cylindrical sleeve mounted radially inwardly of the support to form a barrier in use between cooling fluid passing over the coils and the rotor located within the stator; and
    a housing which extends around the support and has an outer cylindrical surface, wherein a fluid path is defined between the support and the housing for receiving cooling fluid, the fluid path including a plurality of channel sections which extend in a substantially axial direction between an outer cylindrical surface of the support and the housing over the length of the support,
    wherein both the support and the housing define each of a set of holes located at an interface between the support and the housing for receiving axially extending rods that couple the support to the housing, wherein the set of holes locates the rods in the assembled motor between adjacent axially extending channel sections of the fluid path such that the set of holes and the axially extending channel sections overlap each other in the circumferential direction, and wherein the set of holes is located radially inwardly of the outer cylindrical surface of the housing.

* * * * *